US009563824B2

(12) United States Patent
Maggio et al.

(10) Patent No.: US 9,563,824 B2
(45) Date of Patent: Feb. 7, 2017

(54) PROBABILISTIC COLOR CLASSIFICATION

(71) Applicant: QUALCOMM Incorporated, San Diego, CA (US)

(72) Inventors: Emilio Maggio, Vienna (AT); Qi Pan, Vienna (AT); Gerhard Reitmayr, Vienna (AT)

(73) Assignee: QUALCOMM Incorporated, San Diego, CA (US)

( * ) Notice: Subject to any disclaimer, the term of this patent is extended or adjusted under 35 U.S.C. 154(b) by 95 days.

(21) Appl. No.: 14/739,635

(22) Filed: Jun. 15, 2015

(65) Prior Publication Data

US 2016/0364632 A1   Dec. 15, 2016

(51) Int. Cl.
*G06K 9/62* (2006.01)
*G06K 9/46* (2006.01)
*G06K 9/66* (2006.01)

(52) U.S. Cl.
CPC ........... *G06K 9/6277* (2013.01); *G06K 9/4652* (2013.01); *G06K 9/66* (2013.01)

(58) Field of Classification Search
CPC ...... G06K 9/6277; G06K 9/66; G06K 9/4652; G06K 9/6278; G06T 7/0079–7/0097
See application file for complete search history.

(56) References Cited

U.S. PATENT DOCUMENTS

| 7,317,826 | B2 | 1/2008 | Wilensky et al. | |
|---|---|---|---|---|
| 8,320,662 | B2 | 11/2012 | Bailey | |
| 2013/0343642 | A1 | 12/2013 | Kuo et al. | |
| 2015/0221101 | A1* | 8/2015 | Romanenko | ............ G06T 7/408 |

FOREIGN PATENT DOCUMENTS

| WO | WO-2013189925 A2 | 12/2013 |
|---|---|---|
| WO | WO-2014063278 A1 | 5/2014 |

OTHER PUBLICATIONS

Anonymous: "Image Processing—Object Detection Algorithms—Signal Processing Stack Exchange", Jan. 13, 2015 (Jan. 13, 2015), XP055294275, pp. 1, Retrieved from the Internet: URL:http://dsp.stackexchange.com/questions/20005/object-detection-algorithms [retrieved on Aug. 8, 2016] the whole document.

(Continued)

*Primary Examiner* — Chan Park
*Assistant Examiner* — Elisa Rice
(74) *Attorney, Agent, or Firm* — Kilpatrick Townsend & Stockton LLP

(57) ABSTRACT

Methods, systems, computer-readable media, and apparatuses for assigning a color class of a defined finite set of colors to at least one sub-region within a test image are presented. A plurality of sub-regions are identified within a test image. A first sub-region color value is determined for a selected first sub-region of the test image. Using the first sub-region color value and a plurality of zero-order probability distributions, a first color class of the defined finite set of colors is determined as a hypothesis color for the first sub-region. A second sub-region color value is determined for a selected second sub-region of the test image. Using the second sub-region color value and a conditional probability distribution conditioned on the hypothesis color for the first sub-region, a second color class of the defined set of colors is determined. The second color class is assigned to the second sub-region.

25 Claims, 12 Drawing Sheets

(56) References Cited

OTHER PUBLICATIONS

Anonymous: "Lego Brick Recognition Software—General LEGO Discussion—Eurobricks Forums", Jan. 23, 2013 (Jan. 23, 2013), XP055294168, pp. 1-12, Retrieved from the Internet: URL: http://www.eurobricks.com/forum/index.php?showtopic=75840 [retrieved on Aug. 8, 2016] the whole document.
Anzani F., et al., "On-Line Color Calibration in Non-stationary Environments", Jan. 1, 2006 (Jan. 1, 2006), Robocup 2005: Robot Soccer World Cup IX Lecture Notes in Computer Science, Lecture Notes in Artificial Intelligence; Lncs, Springer, Berlin, De, pp. 396-407, XP019035434, ISBN: 978-3-540-35437-6 abstract.
Besag J: "On the Statistical Analysis of Dirty Pictures", Journal of the Royal Statistical Society, Series B. Methodological, Royal Statistical Society, London, GB, vol. 48, No. 3, Jan. 1, 1986 (Jan. 1, 1986), pp. 259-302, XP000881468, ISSN: 0035-9246 p. 259-p. 268 p. 295.
International Search Report and Written Opinion—PCT/US2016/033925—ISA/EPO—Aug. 19, 2016.

\* cited by examiner

PROBABILISTIC COLOR CLASSIFICATION

BACKGROUND

Aspects of the disclosure relate to identifying colors of object components as depicted within images captured in various lighting environments.

Various light sources may provide light having different color characteristics. For example, a fluorescent lamp may produce light with a blue cast (e.g., a color temperature of 4500 Kelvin) and an incandescent lamp may produce light with a red cast (e.g., a color temperature of 2,500 Kelvin). When an image is captured of an object lit by a fluorescent light source, the object in the image may appear to have more of a blue cast compared with an image of the object lit by an incandescent light. For example, a white component of the object may have an RGB value of (252,232,220) in an image captured of the object lit by a source having a red cast, and the same white component may have an RGB value of (229, 255, 255) when the object is imaged under a light that produces a blue cast. Similarly, an object imaged outdoors may have different color characteristics depending on whether the object is imaged under a clear sky, a cloudy sky, or when illuminated by a setting or rising sun.

For many applications, it may be desirable to determine information about colors of objects depicted in images captured in an undefined lighting environment. For example, lighting environment information may not be available when an image is received from a user. Because the colors of an object in an image may vary depending on the lighting source or lighting sources illuminating the object, the colors of the object in the image may not be identifiable from the RGB value of pixels in the depiction of the object alone.

BRIEF SUMMARY

Certain aspects are described that classify colors of object components within images.

In one example, a method for assigning a color from a defined finite set of colors to at least one sub-region within a test image is disclosed. The method includes receiving the test image from a user device. A plurality of sub-regions are identified within the image. A first sub-region of the plurality of sub-regions is selected. A first sub-region color value is determined for the first sub-region. Using the first sub-region color value and a plurality of zero-order probability distributions, a first color class of the defined finite set of colors is determined as a hypothesis color for the first sub-region. The first color class is a highest probability color class for the first sub-region color value. A second sub-region of the plurality of sub-regions is selected. A second sub-region color value is determined for the second sub-region. Using the second sub-region color value and a conditional probability distribution conditioned on the hypothesis color for the first sub-region, a second color class of the defined set of colors is determined to assign to the second sub-region. The second color class is a highest probability color class for the second sub-region color value. The second color class is assigned to the second sub-region.

In another example, a system for assigning a color from a defined finite set of colors to at least one sub-region within a test image is disclosed. The system includes a processor and a memory coupled to the processor. The memory is configurable for storing instructions. The processor is configured to receive the test image from a user device. A plurality of sub-regions are identified within the image. A first sub-region of the plurality of sub-regions is selected. A first sub-region color value is determined for the first sub-region. Using the first sub-region color value and a plurality of zero-order probability distributions, a first color class of the defined finite set of colors is determined as a hypothesis color for the first sub-region. The first color class is a highest probability color class for the first sub-region color value. A second sub-region of the plurality of sub-regions is selected. A second sub-region color value is determined for the second sub-region. Using the second sub-region color value and a conditional probability distribution conditioned on the hypothesis color for the first sub-region, a second color class of the defined set of colors is determined to assign to the second sub-region. The second color class is a highest probability color class for the second sub-region color value. The second color class is assigned to the second sub-region.

In a further example, a non-transitory computer-readable storage medium comprising computer executable code for assigning a color from a defined finite set of colors to at least one sub-region within a test image. The computer executable code includes code for receiving the test image from a user device. A plurality of sub-regions are identified within the image. A first sub-region of the plurality of sub-regions is selected. A first sub-region color value is determined for the first sub-region. Using the first sub-region color value and a plurality of zero-order probability distributions, a first color class of the defined finite set of colors is determined as a hypothesis color for the first sub-region. The first color class is a highest probability color class for the first sub-region color value. A second sub-region of the plurality of sub-regions is selected. A second sub-region color value is determined for the second sub-region. Using the second sub-region color value and a conditional probability distribution conditioned on the hypothesis color for the first sub-region, a second color class of the defined set of colors is determined to assign to the second sub-region. The second color class is a highest probability color class for the second sub-region color value. The second color class is assigned to the second sub-region.

In an additional example, a computing device for assigning a color from a defined finite set of colors to at least one sub-region within a test image is disclosed. The computing device includes means for receiving the test image from a user device. A plurality of sub-regions are identified within the image. The computing device further includes means for selecting a first sub-region of the plurality of sub-regions. The computing device further includes means for determining a first sub-region color value for the first sub-region. The computing device further includes means for determining a first color class of the defined finite set of colors as a hypothesis color for the first sub-region, using the first sub-region color value and a plurality of zero-order probability distributions. The first color class is a highest probability color class for the first sub-region color value. The computing device further includes means for selecting a second sub-region of the plurality of sub-regions. The computing device further includes means for determining a second sub-region color value for the second sub-region. The computing device further includes means for, using the second sub-region color value and a conditional probability distribution conditioned on the hypothesis color for the first sub-region, determining a second color class of the defined set of colors to assign to the second sub-region. The second color class is a highest probability color class for the second sub-region color value. The second color class is assigned to the second sub-region.

BRIEF DESCRIPTION OF THE DRAWINGS

Aspects of the disclosure are illustrated by way of example. In the accompanying figures, like reference numbers indicate similar elements.

DETAILED DESCRIPTION

Figure 1A:
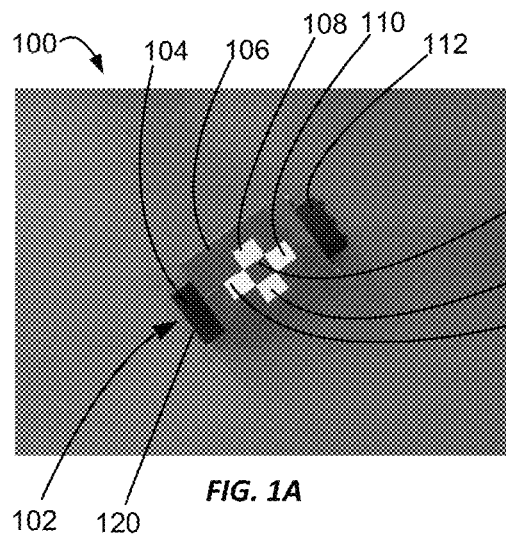
FIGS. 1A-1D illustrate exemplary test images of an object captured under various lighting conditions.

Several illustrative embodiments will now be described with respect to the accompanying drawings. While particular embodiments, in which one or more aspects of the disclosure may be implemented, are described below, other embodiments may be used and various modifications may be made without departing from the scope of the disclosure or the spirit of the appended claims.

A technique is described for identifying colors within an image. The colors to be identified in an image may be limited to a defined finite set of colors. The colors within the image may be classified according to the set of colors in the defined set of colors. The terms "identify color," "classify color," and "determine color" are used interchangeably herein.

In some embodiments, an image is captured of an object. The object may include multiple components. Each component of the object may have a single color from a defined finite set of colors. An object may be identified within an image and the colors of the components of the objects may be determined.

In an illustrative example, an object is constructed from interlocking parts, such as toy bricks. A user may use a user device to capture an image of an object and submit the image to an image processing device. The image processing device may employ the techniques described below to determine the colors of the bricks of the constructed object, although the image processing device does not have information about the lighting conditions under which the image of the object was captured. The image processing device may generate an image of the object based on the image received from the user device. The generated image may include the colors of the object components as determined by the system.

In other illustrative examples, the techniques described herein may be used in laboratory setting, a manufacturing setting, or another environment in which it may be useful to analyze images to identify colors from a defined finite set of colors used for equipment, products, or other imaged objects.

As described herein, the term "image processing device" refers to one or more computing devices capable of receiving image data, storing image data, and/or analyzing an image data, e.g., to perform color classification for an image. For example, an image processing device may include one or more of a server, personal computer, etc.

As described herein, the term "user device" refers to one or more computing devices capable of capturing an image, storing an image, and/or transmitting an image to an image processing device. For example, a user device may include one or more of a camera, mobile phone, laptop computer, desktop computer, tablet, gaming system, gaming system controller or other gaming system peripheral, wearable device etc. In some embodiments, a user may capture an image with one device and transmit the image from the image capturing computing device to a second computing device capable of storing the image and/or transmitting the image to the image processing device.

As described herein, the term "defined finite set of colors" refers to a set of colors with known color values. Color values and/or color identifiers for a defined finite set of colors may be stored by an image processing device. The color values of the defined finite set of colors may be identified using RGB (red, green, blue) color model values or alternative color identification schemes.

In an illustrative example, an object depicted in an image may be an object constructed from a set of colored bricks. In this case, a defined finite set of colors may be the range of colors in which the colored bricks are available. If the colored bricks are available in ten colors, the defined finite set of colors may include the ten colors.

As used herein, "object" may refer to a structure including one or more colors from a defined finite set of colors. For example, an object may be constructed from multiple components. Each object component may have a single color from the definite finite set of colors.

As used herein, "object region" may refer to an area of an image in which an object is depicted. An object region may be an entire image or a portion of an image. In some embodiments, an object may include one or more components. Each component may have a single color from a defined finite set of colors. In other embodiments, an image may include one or more objects and each object may have a single color from a defined finite set of colors. Where identification of a color of an object component is described below, it will be understood that identification of one or more objects in an image could be performed.

As use herein, "sub-region" may refer to an area of an image in which a component of an object is depicted. Because a component typically has a single color from a defined finite set of colors, the pixels of a sub-region typically have substantially the same color value. For example, the pixels of a sub-region may have substantially the same color when RGB color values of the pixels in the sub-region vary from one another by no more than a particular amount in each of the R, G, and B values (such as a variance of no more than 15 in each of the R, G, and B values, e.g., a variance of no more than 5 in each of the R, G, and B values).

As used herein, "test image" may refer to an image received by an image-processing device from a user device. The test image may depict an object. The image may be captured in a lighting environment that is unknown to the image processing device.

As used herein, "training image" may refer to an image depicting a training object. A training object may include all colors of a defined finite color set. A set of training images that capture the training object in various lighting environments may be stored by an image processing device.

FIGS. 1A-1D illustrate exemplary images of an object 102 as captured under various lighting conditions. An image 100 of an object 102 may be produced by a user device.

Object 102 is located in object region 120 of image 100. Region 120 includes sub-regions 104-118 that correspond to components of object 102. Each of components 104-118 may have a single color that is a member of a finite set of colors. For example, sub-regions 104 and 112 are black, sub-regions 106 and 114 are red, sub-regions 110 and 118 are white, and sub-regions 108 and 116 are yellow. Each of the components of object 102 may be built from one or more sub-components, (e.g., toy bricks).

In the illustrative example of FIGS. 1A-1D, the defined finite set of colors may be (red, yellow, blue, green, white, black). For example, each toy brick used to construct object 102 may only be available in a color from the defined finite set of colors.

Figure 1B:
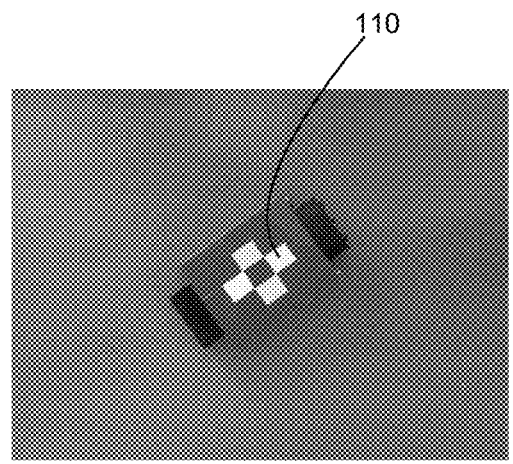
Figure 1C:
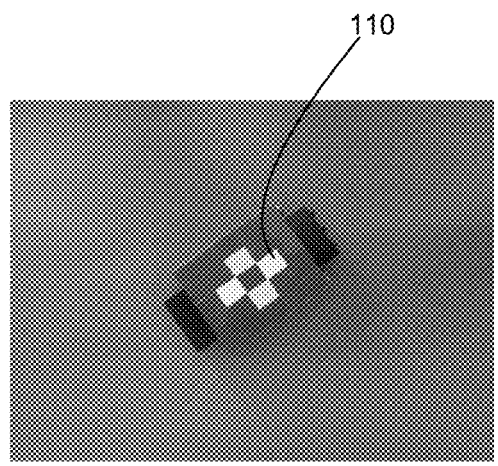
Figure 1D:
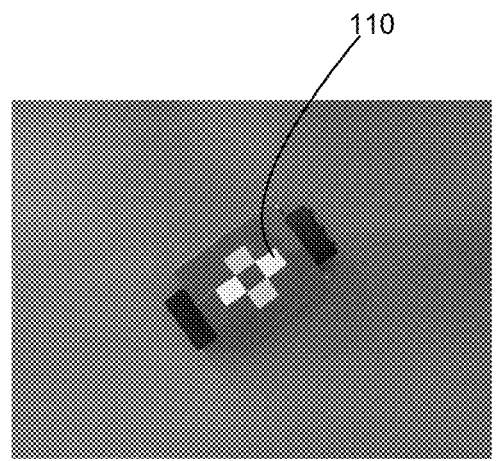

In FIG. 1A, captured in a first lighting condition, sub-region 110 appears to be blue-grey. A sample pixel from sub-region 110 of FIG. 1A has an RGB value of (210, 238, 234). In FIG. 1B, captured in a second lighting environment, sub-region 110 appears to be pale green. A sample pixel from sub-region 110 of FIG. 1A has an RGB value of (226, 247, 201). In FIG. 1C, captured in a third lighting environment, face sub-region 112 appears to be bright blue. A sample pixel from face sub-region 110 of FIG. 1C has an RGB value of (164, 251, 255). In FIG. 1D, captured in a fourth lighting environment, sub-region 110 appears to be light blue. A sample pixel from face sub-region 110 of FIG. 1D has an RGB value of (197, 237, 245).

FIGS. 1A-1D are provided to illustrate how the colors of sub-regions 104-118 may vary when images of object 102 is captured in different lighting environments. One or more images of an object 102, such any of images FIGS. 1A-1D, may be captured by a user and transmitted from a device of the user to an image processing device, e.g., via a network.

Figure 2:
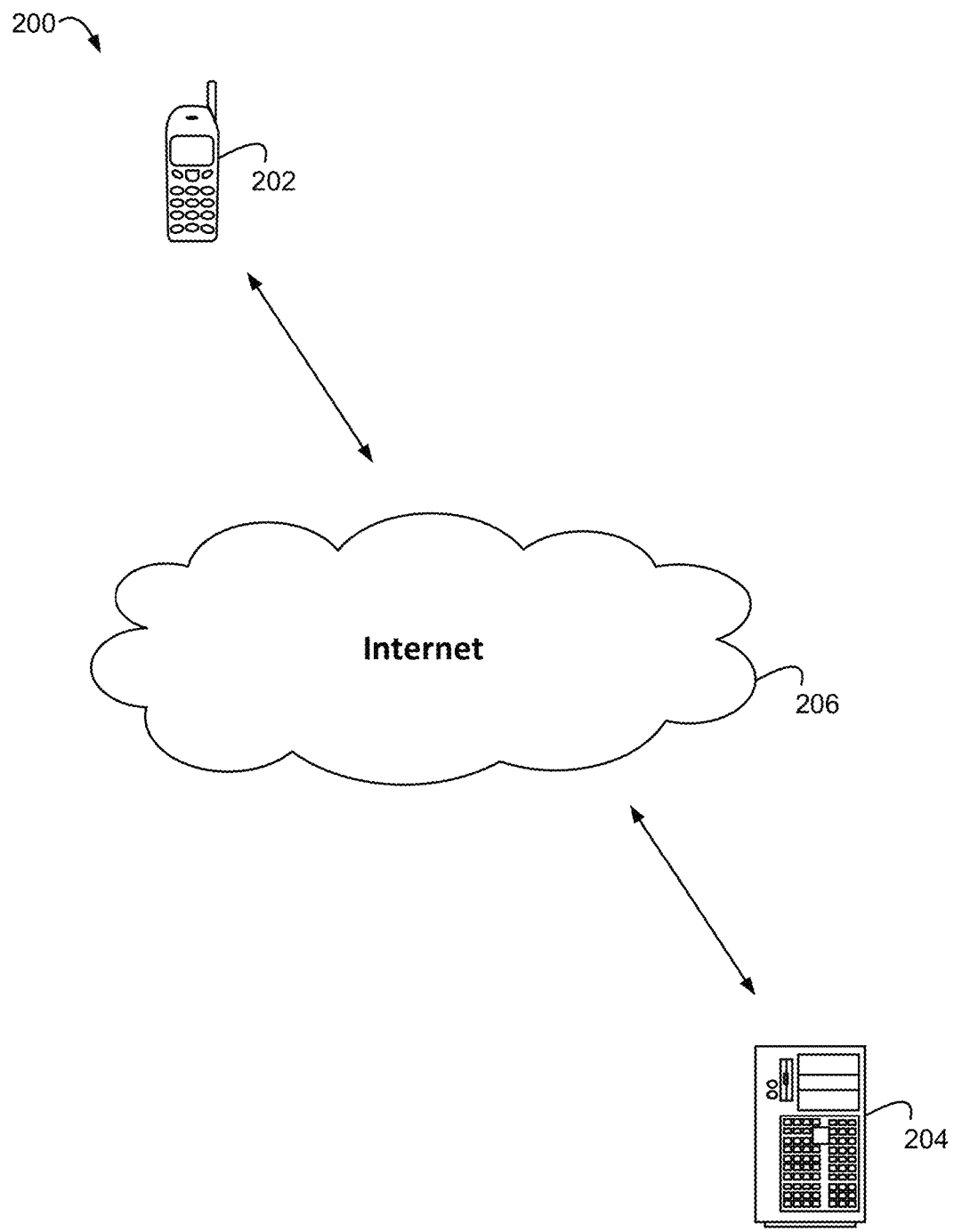
FIG. 2 illustrates an exemplary diagram of a network in which the embodiments described herein may be implemented, according to some embodiments.

FIG. 2 illustrates an exemplary diagram of a network 200 in which the embodiments described herein may be implemented. Network 200 includes user device 202 and image processing device 204. User device 202 may capture one or more images of an object 102, such as the illustrative images shown in FIGS. 1A-1D. User device 202 may transmit one or more of the captured images to image processing device 204, e.g., via Internet 206. It will be recognized that various communications network systems and/or protocols may be used in addition to or in lieu of Internet 206. Images captured and/or transmitted by a user device are referred to herein as "test images." Image processing device 204 may process a test image received from a user device to classify colors of object 102 within the test image.

In some embodiments, color classification performed by image processing device 204 includes a training phase and/or a testing phase. The training phase may be used to produce zero-order probability distributions, first-order conditional probability distributions, and/or higher-order conditional probability distributions for each color class. The testing phase may use the distributions calculated in the training phase to classify colors in a test image received from a user device 202.

Figure 3:
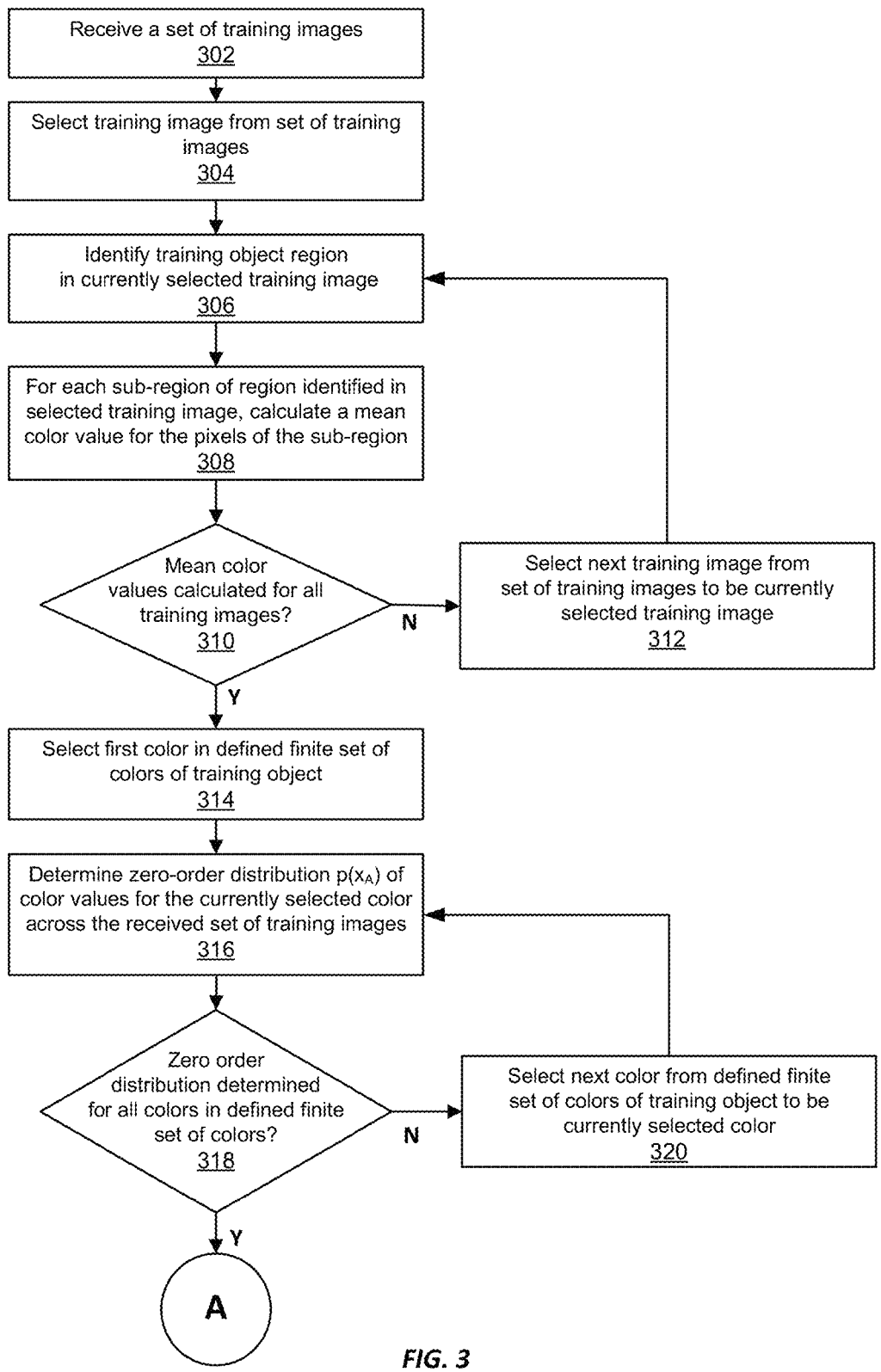
FIG. 3 is a flow diagram illustrating an example of a process for generating zero-order color class distributions in a training phase of a color classification process, according to some embodiments.

FIG. 3 is a flow diagram illustrating an example of a process for generating zero-order color class distributions in a training phase of a color classification process.

At operation 302, image processing device 204 receives a set of training images (e.g., 500, 520, 540, and 560, as described further below with regard to FIGS. 5A-5D). Each training image may include a training object (e.g., training object 400 as described further below with regard to FIG. 4).

Figure 4:
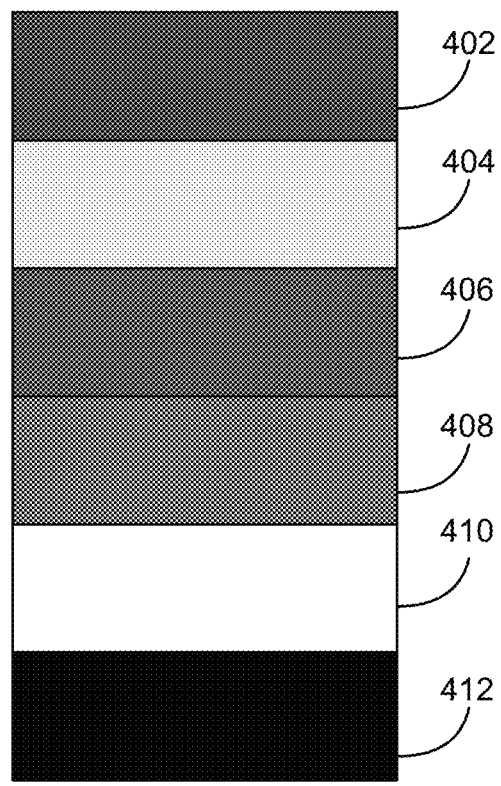
FIG. 4 illustrates an exemplary training object, according to an embodiment.
Figure 5A:
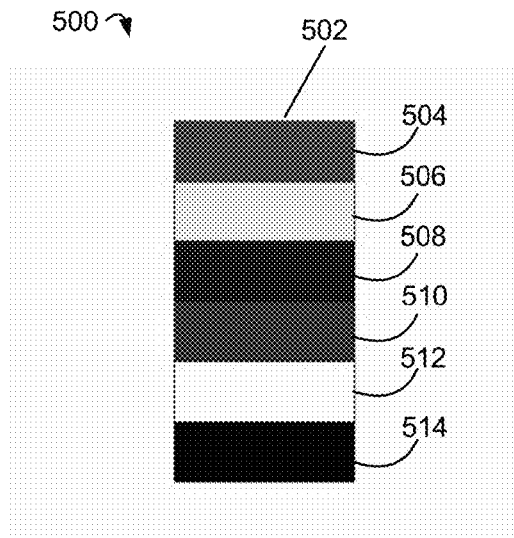
FIGS. 5A-5D illustrate an exemplary set of training images of a training object as captured under various lighting conditions.
Figure 5B:
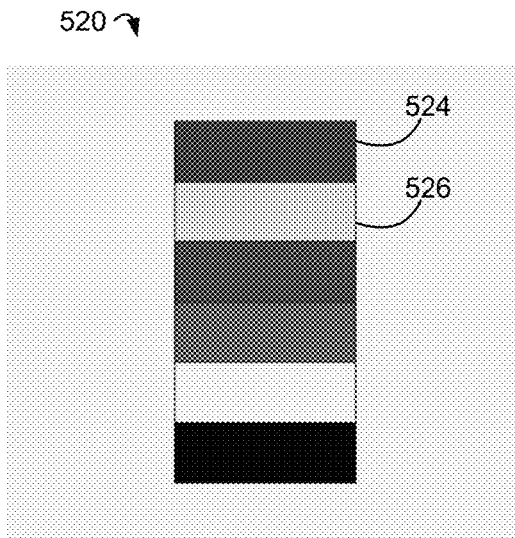
Figure 5C:
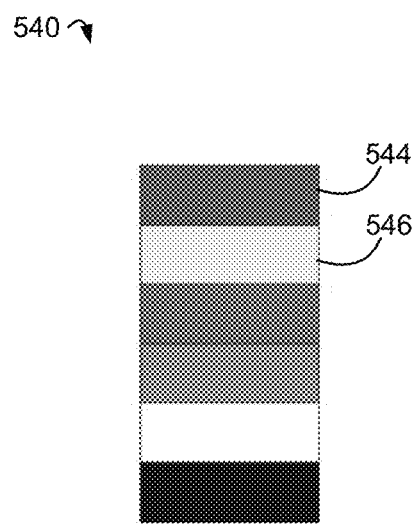
Figure 5D:
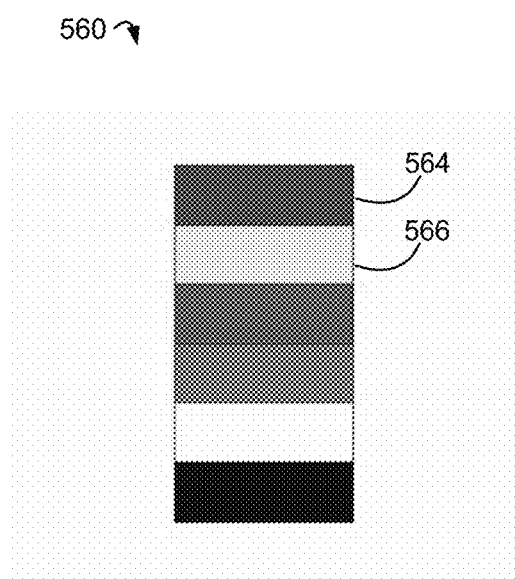

FIG. 4 illustrates an exemplary training object 400, according to an embodiment. Training object 400 includes one component of each color in a defined finite set of colors. In an illustrative example, a defined finite set of colors includes the set of colors (red, yellow, blue, green, white, black). In accordance with this example, training object 400 includes red training component 402, yellow training component 404, blue training component 406, green training component 408, white training component 410 and black training component 412. In some embodiments, the defined finite set of colors used for training object 400 is the same defined finite set of colors available for constructing an object in a user-provided image (e.g., object 102 of user-provided image 100).

FIGS. 5A-5D illustrate an exemplary set of training images 500, 520, 540, and 560 of training object 400 as captured under various lighting conditions. Whereas an object in a user-provided image, such as object 102 in user-provided image 100, is typically an object about which image processing device 204 has no prior information, the components of training object 400 may have a configuration that is known to image processing device 204. For example, image processing device 204 may receive data indicating the arrangement of the components 402-412 of training object 400. It will be understood that the number of images in the set of training images may include a different number of images from the four training images shown at FIG. 5A-5D. For example, a set of 100-10,000 images may be used, such as 3000 images. The number of training images in a training set may depend upon, for example, an anticipated degree of variation of lighting conditions, interdependencies between colors, etc.

A training image, such as training image 500, may include training region 502 defining an area in which training object 400 is depicted in training image 500. Training region 502 may include one or more sub-regions 504-514. For example, sub-regions 504-514 may correspond to training components 402-412, respectively, of training object 400.

Using the set of training images 500, 520, 540, and 560, image processing device 204 may determine probability distributions for a defined finite set of colors as captured under various lighting conditions. The probability distributions determined may be used by image processing device 204 to identify colors in a test image (e.g., image 100) received from user device 202.

Returning now to FIG. 3, at operation 304, image processing device 204 selects a training image (e.g., training image 500) from the set of training images (e.g., 500, 520, 540, and 560). Image processing device 204 may select a training image at random from the set of training images, may select the first image in the set of training images, or may use another approach to selecting a training image from the set of training images.

At operation 306, image processing device 204 may use any of various well known image processing techniques to identify training object region 502 defining the location of training object 400 as depicted within training image 500. Data about training object 400 received by image processing device 204 or determined by image processing device 204 may be used for identifying training object region 502. In some embodiments, it is not necessary to perform operation 306, e.g., when a training object region occupies the entirety of a training image.

At operation 308, image processing device 204 may determine a mean color value for the pixels of each training image sub-region 504-514. The mean color value for a sub-region may be expressed as an RGB value. For example, a first mean color value for training image sub-region 504 may be determined by calculating an average R (red) value from the R values of all pixels in training image sub-region 504, calculating an average G (green) value from the G value of all pixels in training image sub-region 504, and calculating an average B (blue) value from the B value of all pixels in training image sub-region 504. The average RGB value for training image sub-region 504 may include the average R, average G, and average B value calculated for training image sub-region 504. Mean color values may be determined for sub-regions 506-514 using the approach described with regard to training image sub-region 504.

At decision diamond 310, image processing device 204 may determine whether mean color values have been determined for all of the training images (e.g., 500, 520, 540, and 560) in the received set of training images. If mean color values have not been determined for all of the training images, flow may proceed to operation 312. If mean color values have been determined for all of the training images, flow may proceed to operation 314.

In some embodiments, flow may proceed from decision diamond 310 to operation 314 before mean color values have been determined for all of the received training images. For example, flow may proceed from decision diamond 310 to operation 314 when mean color values have been calculated for a subset of the received training images that is sufficient for training needs, e.g., for a number of training images exceeding a threshold number of images.

At operation 312, image processing device 204 selects a next training image of the received set of training images. For example, image processing device 204 may select a next training image at random from the set of training images, may select a next image in the set of training images, or may use another approach to selecting a next training image from the set of training images.

At operation 314, image processing device 204 selects a first color in a defined finite set of colors for training object of the received training images. For example, the finite set of colors for training object 400 is (red, yellow, blue, green, white, black) as indicated at 402-412 of FIG. 4. In an illustrative example, a first color class selected by image processing device 204 may be the color class "red" (i.e., the color of component 402 of training object 400).

At operation 316, image processing device 204 may determine a zero-order probability distribution of color values for the selected first color using the calculated mean color values for all of the received training images (or, in some embodiments, a subset of the received training images). In an illustrative example, a zero-order probability distribution of RGB color values for the color red may be determined using the mean RGB color values calculated for sub-regions 504, 524, 544, and 564. A zero-order probability distribution for a color class can be expressed using the notation $p(x_A|A$=color class), e.g., $p(x_A|A$=red). In some embodiments, a Gaussian function may be used to generate an estimate for the zero-order probability distribution.

In other embodiments, a Gaussian Mixture Model, a kernel density estimator, a histogram, and/or other approaches to distribution modeling known in the art may be used to generate an estimate for the zero-order probability distribution.

Figure 6A:
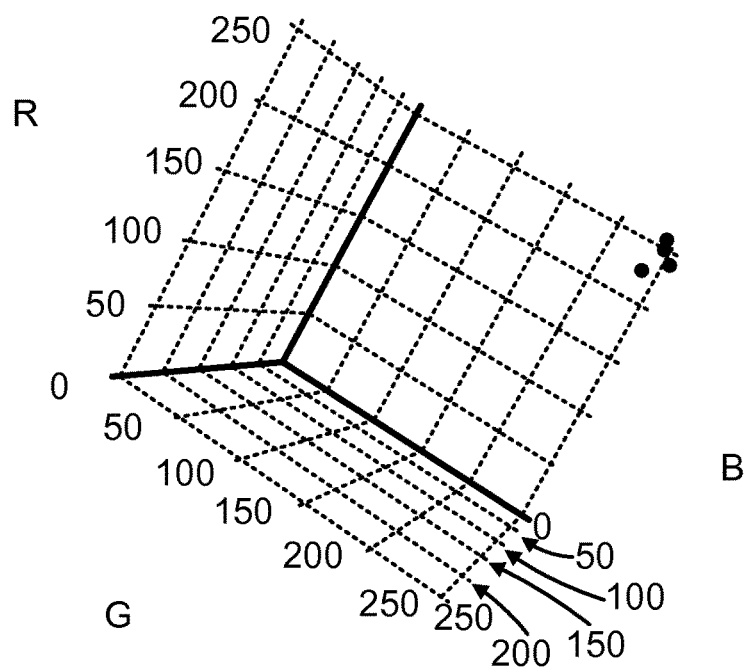
FIGS. 6A-6B are scatter plots illustrating exemplary color value distributions for the sub-regions associated with a color class in a set of training images.
Figure 6B:
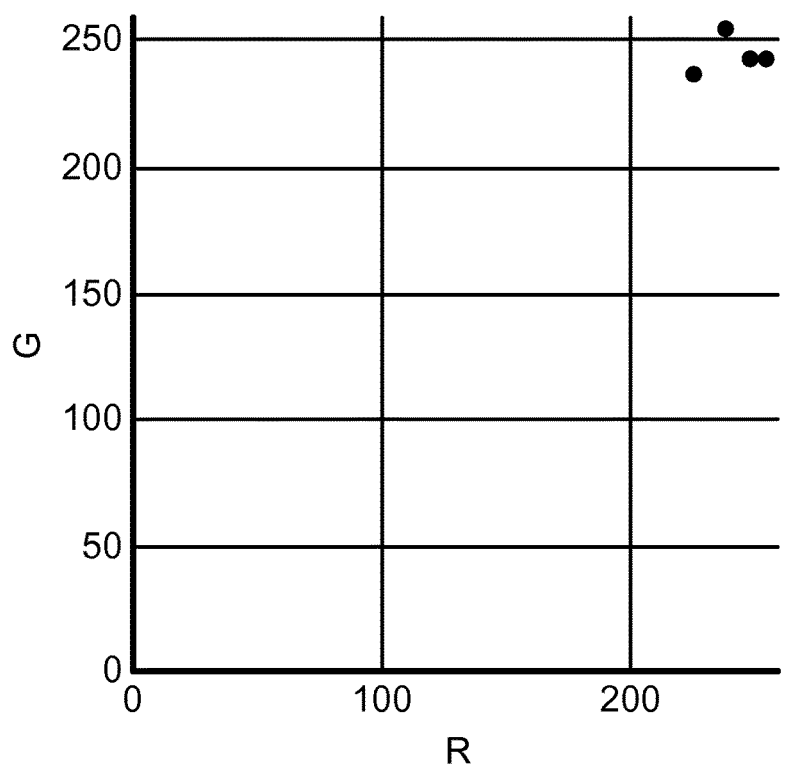

FIGS. 6A-6B illustrate exemplary distributions of color values for sub-regions 506, 526, 546, and 566 associated with the yellow color class in training images 500, 520, 540, and 560, respectively. A zero-order probability distribution for yellow, i.e., $p(x_A|A$=yellow) can be determined using the data illustrated in FIG. 6A. As can be seen from the coordinates of the three-dimensional scatter plot shown in FIG. 6A, the mean RGB color value for all of the pixels of training image sub-region 506 is (249, 243, 0), the mean RGB color value for all of the pixels of training image sub-region 526 is (226, 237, 11), the mean RGB color value for all of the pixels of training image sub-region 546 is (239, 255, 35), and the mean RGB color value for all of the pixels of training image sub-region 566 is (255, 243, 25). For added legibility, FIG. 6B is included. FIG. 6B is a two-dimensional scatter plot with coordinates indicating the mean R (red) and G (green) values of the mean RGB color values associated with sub-regions 506, 526, 546, and 566.

Returning again to FIG. 3, at decision diamond 318, image processing device 204 may determine whether a zero-order probability distribution has been determined for all colors in the finite set of colors of training object 400. If zero-order probability distributions have not been determined for all of the finite set of colors for training object 400, flow proceeds to operation 320. If zero-order probability distributions have been determined for all of the finite set of colors for training object 400, flow proceeds to operation to operation 702, as indicated at "A" of FIG. 3 and FIG. 7.

Figure 7:
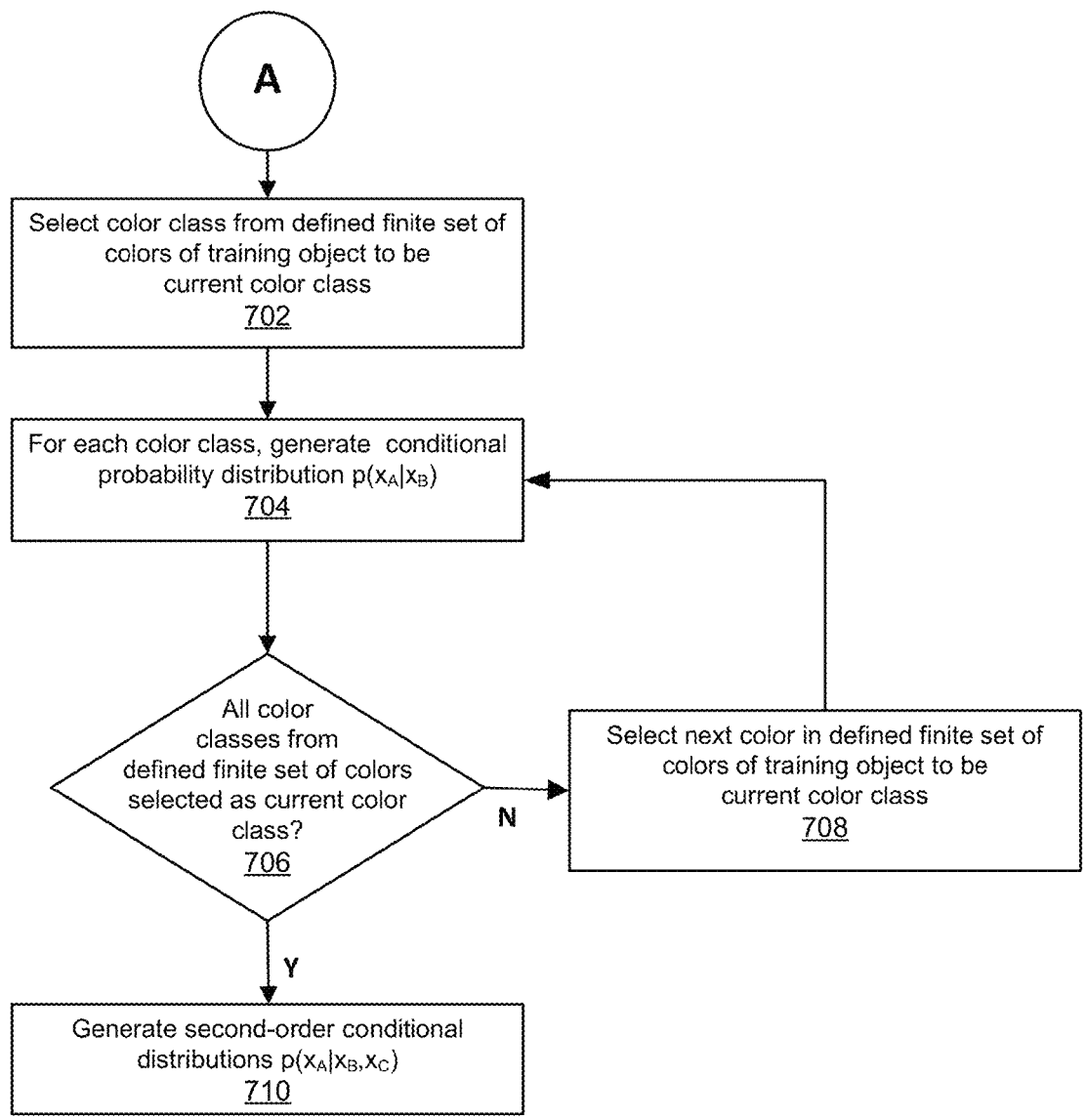
FIG. 7 is a flow diagram illustrating an example of a process for generating first-order color class conditional probability distributions and higher-order color class conditional probability distributions in a training phase of a color classification process, according to some embodiments.

FIG. 7 is a flow diagram illustrating an example of a process for generating first-order color class conditional probability distributions and higher-order color class conditional probability distributions in a training phase of a color classification process. A conditional probability distribution indicates the probability that a color value for a sub-region belongs to a color class of a defined finite set of colors given that a color class for at least one other color class is known or assumed. For example, when a particular color value (e.g., an RGB color value) is determined for a red sub-region in a training image, a first-order conditional probability for color class blue can be expressed using the notation $p(x_A|x_B,$ A=blue, B=red).

At operation 702, image processing device 204 may select a first color from a defined finite set of colors for training object 400. In an illustrative example, a first color class selected by image processing device may be the color class "red" (i.e., the color of component 402 of training object 400).

At operation 704, image processing device 204 may determine a first-order conditional probability distribution for each color class. For example, when "red" is the selected color class from a finite set of colors (red, yellow, blue, green, white, black), first-order conditional probability distributions may be determined for the set of colors (red, yellow, blue, green, white, black). The first-order conditional probability distributions calculated at operation 704 in accordance with this illustrative example may be expressed as follows:

$$p(x_A|x_B, A=\text{red}, B=\text{red})$$

$$p(x_A|x_B, A=\text{yellow}, B=\text{red})$$

$$p(x_A|x_B, A=\text{blue}, B=\text{red})$$

$$p(x_A|x_B, A=\text{green}, B=\text{red})$$

$$p(x_A|x_B, A=\text{white}, B=\text{red})$$

$$p(x_A|x_B, A=\text{black}, B=\text{red}).$$

The first-order conditional probability distributions may be determined by, e.g., using a joint distribution, e.g., for class A and class B, based on the zero-order distributions determined at operation 316.

For example, a conditional distribution may be a Gaussian distribution obtained from a joint distribution. A conditional covariance may be obtained by combining zero-order covariances for classes A and B with the cross-covariance between the classes A and B. A conditional mean may be a combination of the means for classes A and B adjusted by the cross-covariance and parameterized by the known value A corresponding to $x_B$.

At operation 706, image processing device 204 determines whether all color classes from the defined finite set of colors have been selected as the selected color class. If additional color classes remain to be selected as a current color class, flow may proceed to operation 708. If all color classes have been selected, flow may proceed to operation 710.

In some embodiments, higher-order probability distributions may be generated from the trial images. For example, second-order conditional probability distributions may be generated, e.g., $p(x_A|x_B, x_C)$, third-order conditional probability distributions may be generated e.g., $p(x_A|x_B, x_C, x_D)$, and so on. Generating higher-order probability distributions may allow color classifications to be determined with improved accuracy in the test phase.

At operation 710, second-order conditional probability distributions may be generated. For example, in accordance with an illustrative example, a set of second order conditional probability distributions including: $p(x_A|x_B, x_C,$ A=red, B=blue, C=yellow), $p(x_A|x_B, x_C,$ A=red, B=blue, C=green), and so on, may be generated for the set of colors in the defined finite set of colors.

The distributions generated in a training phase of color classification as described with regard to FIG. 3 and FIG. 7 may be used to identify colors in an image (e.g., image 100) received by image processing device 204 from user device 202, as described below with regard to FIG. 8-FIG. 9 . The processes described in FIGS. 8-FIG. 9 may be used by image processing device 204 to identify colors within image 100 on the basis of a defined finite set of colors of object 102 when object 102 depicted in image 100 is unknown to image processing device 204 and/or when image 100 has been captured in an unknown lighting environment.

Figure 8:
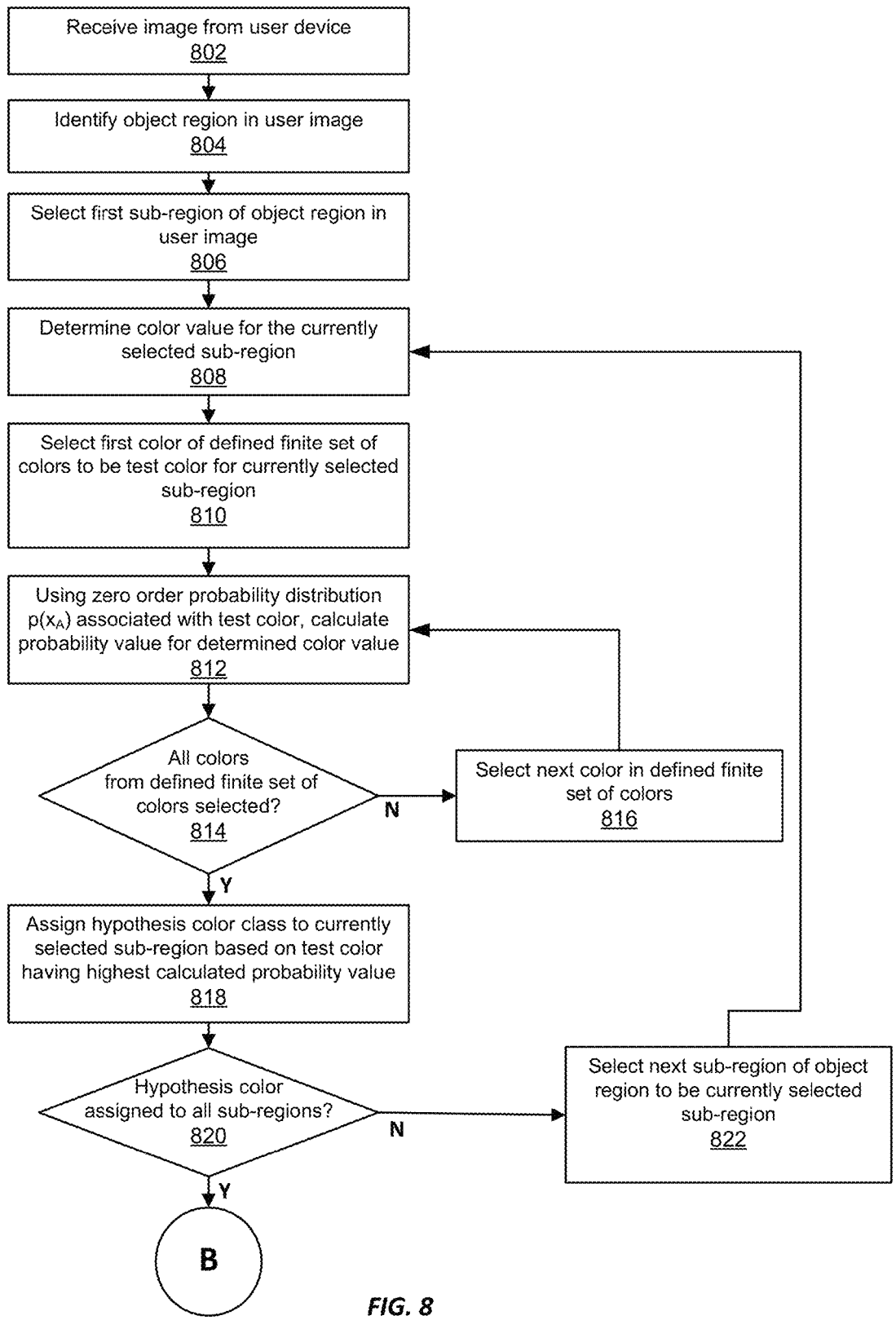
FIG. 8 is a flow diagram illustrating an example of a process for assigning hypothesis color values to a test image received from a user device in a test phase of a color classification process, according to some embodiments.

FIG. 8 is a flow diagram illustrating an example of a process for assigning hypothesis color values to an image (e.g., image 100) received from a user device 202.

At operation 802, image processing device 204 receives an image, e.g., image 100, from user device 202. Image 100 may be an image of an object, e.g., object 102.

At operation 804, image processing device 204 may use any of various well known image processing techniques to identify an object region 120 defining a location of object 102 as depicted within user image 100. In some embodiments, it is not necessary to perform operation 804, e.g., when an object region 120 occupies the entirety of a user image 100. Object region 120 may include a plurality of sub-regions, e.g., user image sub-regions 104-118. In some embodiments, the colors of all sub-regions within object region 120 are limited to colors of the defined finite set of colors of training object 400. For example, object 102 may be constructed from a set of components having the same set of colors as the components of training object 400.

At operation 806, image processing device 204 may select a first sub-region (e.g., test image sub-region 104) of object region 120. Image processing device 204 may select a sub-region at random from the sub-regions of the object region (e.g., sub-regions 104-118 of object region 120), may select a first sub-region in the set of sub-regions, or may use another approach to selecting a sub-region from the set of sub-regions.

At operation 808, image processing device 204 may determine a color value for the currently selected sub-region (e.g., test image sub-region 104). The color value may be an RGB value. The color value may be determined for a randomly selected pixel within the sub-region, for an average of all of the pixels within the sub-region, or using another approach. For example, image processing device 204 may determine that the RGB color value for a randomly selected pixel within test image sub-region 104 is (29, 25, 29).

At operation 810, image processing device 204 may select a first color from the defined finite set of colors to be a test color for the currently selected sub-region. Image processing device 204 may select a color at random from the defined finite set of colors, may select a first color in the defined finite set of colors, or may use another approach to selecting a color from the defined finite set of colors. For example, of the defined finite set of colors (red, yellow, blue, green, white, and black) for training object 400, red may be selected as a first color.

At operation 812, image processing device 204 calculate a probability value for the color value determined at operation 808 using a probability distribution associated with the selected color from the defined finite set of colors. For example, a zero-order probability distribution $p(x_A|A=\text{color class})$ as determined at operation 316 may be used. In an illustrative example, a probability may be calculated using determined color value (29, 25, 29) for test image sub-region 104 and probability distribution $p(x_A|A=\text{red})$.

At decision diamond 814, image processing device 204 may determine whether all colors from the defined finite set of colors have been selected as a test color. For example, image processing device 204 may determine whether all colors of the defined finite set of colors (red, yellow, blue, green, white, and black) for training object 400 have been selected as a test color. If not all colors from the defined finite set of colors have been selected as a test color, flow may proceed to operation 816. If all colors from the defined finite set of colors have been selected as a test color, flow may proceed to operation 818.

At operation 816, image processing device 204 may select a next color of the defined set of colors to be a currently selected test color.

At operation 818, image processing device 204 may assign a hypothesis color class to the currently selected sub-region (e.g., test image sub-region 104). Image processing device 204 may use the test color having a highest probability value as determined at operation 812 to be a hypothesis color class to assign to a user image sub-region.

In one embodiment, the color value determined for the currently selected sub-region (e.g., test image sub-region 104) may be compared with each zero-order probability distribution in the set of zero-order probability distributions calculated at operations 316-320, and the color associated with the zero-order probability distribution that is the highest probability match for the determined color value is selected as a hypothesis color for the sub-region. For example, RGB value (29, 25, 29) for test image sub-region 104 may be compared with the zero-order probability distributions for all of the colors in the defined finite set of colors of training object 400 as determined at operations 316-320, i.e., $(x_A|A=\text{red})$, $p(x_A|A=\text{yellow})$, $p(x_A|A=\text{blue})$, $p(x_A|A=\text{green})$, $p(x_A|A=\text{white})$, $p(x_A|A=\text{black})$. If RGB value (29, 25, 29) falls most probably within the zero-order probability distribution $p(x_A|A=\text{black})$, the color black is assigned as a hypothesis color for test image sub-region 104.

In another embodiment, the color value determined for a currently selected sub-region may be compared with zero-order probability distributions in the set of zero-order probability distributions calculated at operations 316-320 until a threshold probability is satisfied. The color associated with the zero-order probability distribution that satisfies the threshold probability may be selected as the hypothesis color for the currently selected sub-region. It will be recognized that other approaches may be used for assigning a hypothesis color to a currently selected sub-region.

At decision diamond 820, image processing device 204 may determine whether a hypothesis color has been assigned to all sub-regions in the set of sub-regions of an object region of a test image. For example, image processing device 204 may determine whether all of sub-regions 104-118 of object region 102 have been assigned a hypothesis color. If a hypothesis color has not been assigned to all sub-regions in the set of sub-regions of an object region, flow may proceed to operation 822. If a hypothesis color has been assigned to all sub-regions in the set of sub-regions of an object region, flow may proceed to operation 902, as indicated at "B" of FIG. 8 and FIG. 9.

At operation 822, a next sub-region in the set of sub-regions is selected as a currently selected sub-region.

Figure 9:
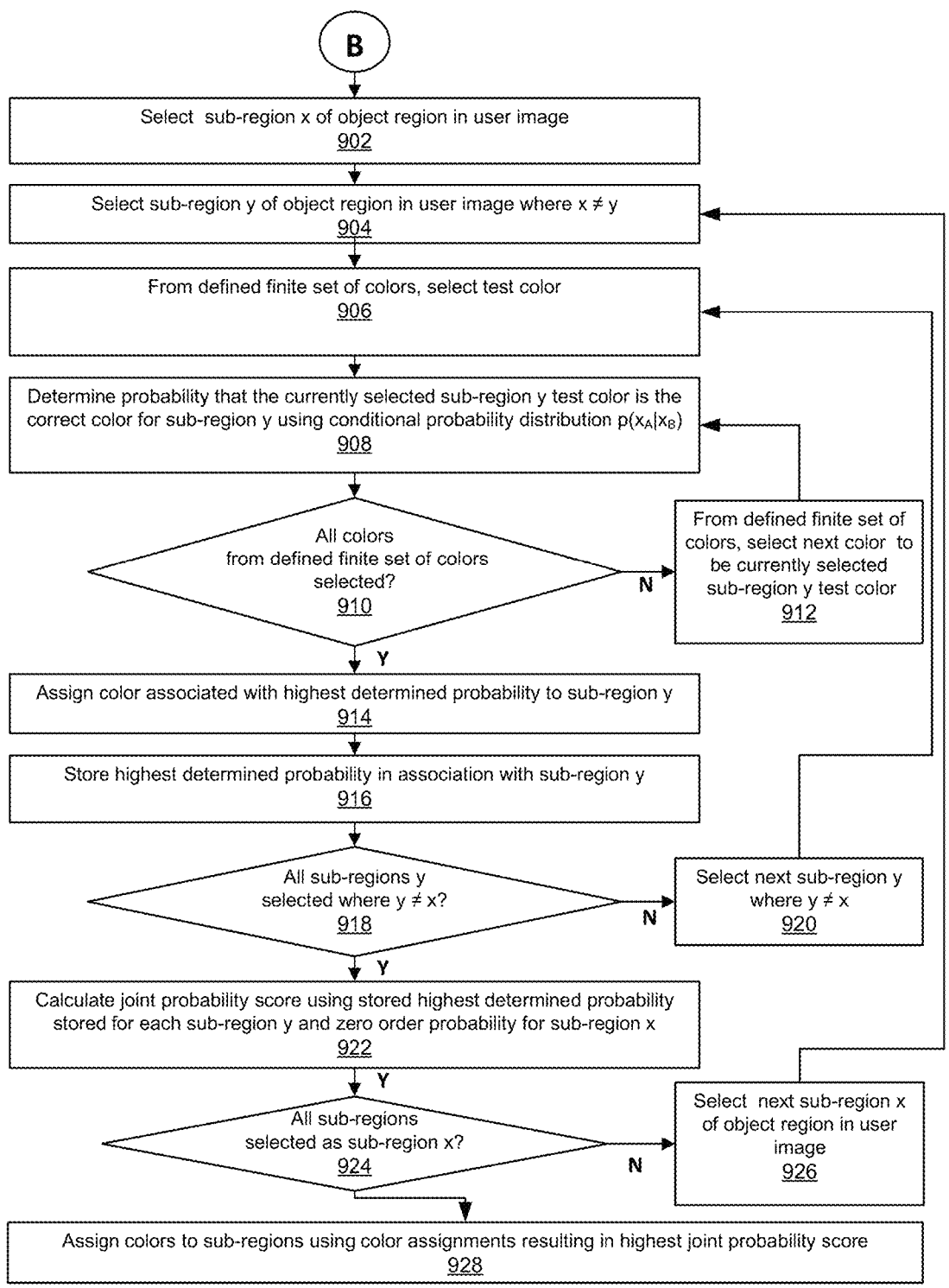
FIG. 9 is a flow diagram illustrating an example of a process for determining color classes for sub-regions of an object region in a user image in a test phase of a color classification process, according to some embodiments.

FIG. 9 is a flow diagram illustrating an example of a process for determining color classes for sub-regions of an object region in a user image.

At operation 902, image processing device 204 may select a sub-region (e.g., test image sub-region 114) of object region 120. Image processing device 204 may select a sub-region at random from the sub-regions of the object region (e.g., sub-regions 104-118 of object region 120), may select a first sub-region in the set of sub-regions, or may use another approach to selecting a sub-region from the set of sub-regions. Typically, a sub-region is randomly selected in operation 902.

At operation 904, image processing device 204 may select a second sub-region of object region 120. The second sub-region (i.e., "sub-region y") is different from the first sub-region (i.e., "sub-region x"). In the illustrative example described above with regard to operation 902, the first sub-region selected is test image sub-region 114. A second sub-region (sub-region y) may be, for example, test image sub-region 116. The sub-region may be selected using various sub-region selection approaches described above.

Color values may be determined for the sub-region x and sub-region y. The color values may be determined for a randomly selected pixel within the sub-region, for an average of all of the pixels within the sub-region, or using another approach.

At operation 906, image processing device 204 may select a color to test for sub-region y. For example, if sub-region x is test image sub-region 116, and the hypothesis color selected for test image sub-region 116 is yellow, then blue may be selected as a test color for sub-region y (test image sub-region 110). A test color may be the same color as the currently selected hypothesis color. The test color may be selected using various color selection approaches described above.

At operation 908, image processing device 204 may determine a probability that the currently selected test color for sub-region y is the correct color for the component of the object depicted in the test region. For example, the determination of operation 908 may use the first-order probability distribution determined at operation 704 of the training phase for the test color for sub-region y, the hypothesis color for sub-region x, a color value determined for sub-region x, and a color value determined for sub-region y. Because the first-order probability used for the determination of operation 908 is indicates a probability that the test color for sub-region y is correct assuming that the hypothesis color for sub-region x is correct, the first-order probability may be said to be conditioned on the hypothesis color of sub-region x. For example, if the test color for sub-region y is blue and the hypothesis color for sub-region x is yellow, the first-order probability distribution $p(x_A|x_B, A=\text{blue}, B=\text{yellow})$ is used to determine the probability that color value of sub-region y indicates that sub-region y is blue given that the color value for sub-region x is assumed to be yellow.

In some embodiments, second-order probability distributions, as generated at operation 710, and/or higher-order probability distributions may be used in lieu of or in addition to the first-order probability distribution to generate probabilities for the currently selected test color for a sub-region. Two or more sub-regions may be selected as sub-region x for the determinations using second-order probability distributions and/or higher-order probability distributions with respect to selected test colors for sub-region y.

At decision diamond 910, image processing device 204 may determine whether all colors from the defined finite set of colors have been selected as test colors. For example, if the hypothesis color of sub-region x is yellow, the colors from the set (red, yellow, blue, green, white, black) from the defined finite set of colors of training object 400 are to be selected as test colors. If all colors from the defined finite set of colors have not been selected as test colors, flow may proceed to operation 912. If all colors from the defined finite set of colors have been selected as test colors, flow may proceed to operation 914. In some embodiments, fewer than all of the colors may be used as test colors. For example, a limit on the number of test colors to be selected may be set by a user, and decision diamond 910 can determine whether that limit has been met.

At operation 912, image processing device 204 may select a next color from the defined finite set of colors.

At operation 914, image processing device 204 may assign a new hypothesis color to sub-region y using the probabilities determined at operation 908. In the illustrative example in which sub-region x is test image sub-region 116 with a hypothesis color yellow and sub-region y is test image sub-region 110, image processing device 204 may compare the first-order probability distributions p($x_A|x_B$, A=blue, B=yellow); ($x_A|x_B$, A=red, B=yellow); ($x_A|x_B$, A=yellow, B=yellow); ($x_A|x_B$, A=green, B=yellow); ($x_A|x_B$, A=white, B=yellow); and ($x_A|x_B$, A=black, B=yellow) to determine a color class A that resulted in a highest probability given B=yellow. For example, if the highest probability outcome occurred when blue was the selected test color, i.e., the highest probability is p($x_A|x_B$, A=blue, B=yellow), blue may be the "highest probability color class" that is assigned to be the new hypothesis color of test image sub-region 112. An approach such as this may be used wherever a determination of a highest probability occurs in the processes described herein.

The new hypothesis color assigned to sub-region y at operation 914 may be the hypothesis color used for the sub-region if it is subsequently selected as sub-region x. For example, if blue is assigned to be the new hypothesis color of test image sub-region 112, blue may be used as the hypothesis color for test image sub-region 112 if test image sub-region 112 is subsequently selected as sub-region x.

It will be recognized that other approaches may be used by image processing device 204 for determining a highest probability color for a sub-region y. For example, the first time a probability is determined at operation 908, the probability may be stored as a current highest probability. When a probability is subsequently determined at operation 908, the new probability may be compared to the previously stored current highest probability, and, if the new current probability is higher than the previously stored current highest probability, the new probability may be stored as the current highest probability. At operation 914, the new hypothesis color assigned to sub-region y may be the test color associated with the current highest probability. An approach such as this may be used wherever a determination of a highest probability occurs in the processes described herein.

At operation 916, a probability is stored in association with sub-region y. The stored probability is the highest probability used at operation 914 for assigning a new hypothesis color to sub-region y. For example, if the highest probability outcome occurred when blue was the selected test color for sub-region y and yellow was the hypothesis color for sub-region, i.e., the highest probability is p($x_A|x_B$, A=blue B=yellow), then the probability value for p($x_A|x_B$, A=blue, B=yellow) is stored at operation 916.

At decision diamond 918, image processing device 204 may determine whether all sub-regions other than sub-region x have been selected as sub-region y. For example, if sub-region x is test image sub-region 114, then sub-regions from the set of sub-regions (104, 106, 108, 110, 112, 116, 118) are to be selected as sub-region y. If all sub-regions other than sub-region x have not been selected as sub-region y, flow may proceed to operation 920. If all sub-regions other than sub-region x have been selected as sub-region y, flow may proceed to operation 922.

At operation 920, image processing device 204 may select a next sub-region of object region 120 to be a currently selected sub-region y.

At operation 922, image processing device 204 may calculate a joint probability score using the highest determined probabilities stored for each sub-region y corresponding to a particular sub-region x as stored at operation 916. The joint probability score may be determined as follows:

$$p(x_A, x_B, \ldots x_K) \cong p(x_A|x_B)p(x_C|x_B) \ldots p(x_K|x_B)p(x_B)$$

For example, in the illustrative example in which sub-region x is test image sub-region 114 with a hypothesis color yellow, highest determined probabilities for the other sub-regions (sub-regions y) may have been determined as follows:

Test image sub-region 104: test color black had the highest probability when hypothesis color yellow is used for test image sub-region 116. Probability stored at operation 916 was p($x_A|x_B$, A=black, B=yellow).

Test image sub-region 106: test color red had the highest probability when hypothesis color yellow is used for test image sub-region 116. Probability stored at operation 916 was p($x_A|x_B$, A=red, B=yellow).

Test image sub-region 108: test color yellow had the highest probability when hypothesis color yellow is used for test image sub-region 116. Probability stored at operation 916 was p($x_A|x_B$, A=yellow, B=yellow).

Test image sub-region 110: test color blue had the highest probability when hypothesis color yellow is used for test image sub-region 116. Probability stored at operation 916 was p($x_A|x_B$, A=blue, B=yellow).

Test image sub-region 112: test color black had the highest probability when hypothesis color yellow is used for test image sub-region 114. Probability stored at operation 916 was p($x_A|x_B$, A=black, B=yellow).

Test image sub-region 114: test color red had the highest probability when hypothesis color yellow is used for test image sub-region 116. Probability stored at operation 916 was p($x_A|x_B$, A=red, B=yellow).

Test image sub-region 118: test color blue had the highest probability when hypothesis color yellow is used for test image sub-region 116. Probability stored at operation 916 was p($x_A|x_B$, A=blue, B=yellow).

In this illustrative example, image processing device 204 may calculate a joint score p($x_A, x_B, \ldots x_K$) for the sub-regions of object region 120 as follows:

$$p(x_A|x_B, A\text{=black}, B\text{=yellow})p(x_A|x_B, A\text{=red}, B\text{=yellow})$$

$$p(x_A|x_B, A\text{=yellow}, B\text{=yellow})p(x_A|x_B, A\text{=blue}, B\text{=yellow})$$

$$p(x_A|x_B, A\text{=black}, B\text{=yellow})p(x_A|x_B, A\text{=red}, B\text{=yellow})$$

$$p(x_A|x_B, A\text{=blue}, B\text{=yellow})p(x_A, A\text{=yellow})$$

Where p($x_A$, A=yellow) is determined using the zero-order probability for yellow as determined at operation 316 and a determined color value for the selected sub-region x 114.

At decision diamond 924, image processing device 204 may determine whether all sub-regions have been selected as sub-region x. If all sub-regions have not been selected as sub-region x, flow may proceed to operation 926. If all sub-regions have not been selected as sub-region x, flow may proceed to operation 928.

In some embodiments, in lieu of or in addition to determining whether all sub-regions have been selected, decision diamond 924 may determine whether a threshold joint score is met or exceeded by a joint score calculated at operation 922. Flow may proceed to operation 928 when the threshold joint score is not met or exceeded. Other approaches may be used to determine when flow is to proceed from decision diamond 924 to operation 928.

At operation 926, image processing device 204 may select a next sub-region of object region 120 to be a currently selected sub-region x.

At operation 928, image processing device 204 may identify colors of the sub-regions of an object region (e.g., sub-regions 104-118 of object region 120) based on the highest joint probability score calculated at operation 922. In some embodiments, a joint probability score is stored each time operation 922 is performed. The joint probability score may be stored in association with the color assignments for sub-region x and each sub-region y that produce the joint probability score result. Image processing device 204 may compare the stored joint probability score to determine a highest joint probability score. The colors of sub-regions 104-118 of object region 120 may be identified using the color assignments that resulted in the highest joint probability score at operation 922.

It will be recognized that other approaches may be used by image processing device 204 for determining a highest joint probability score. For example, the first time a joint probability score is determined at operation 922, the joint probability score may be stored as a current highest joint probability score. When a joint probability score is subsequently determined at operation 922, the new joint probability score may be compared to the previously stored current highest joint probability score, and, if the new current highest joint probability score is higher than the previously stored current highest joint probability score, the new joint probability score may be stored as the current highest joint probability score. At operation 928, the colors identified for sub-regions 104-118 of object region 120 may be the colors associated with the current highest joint probability score.

Figure 10A:
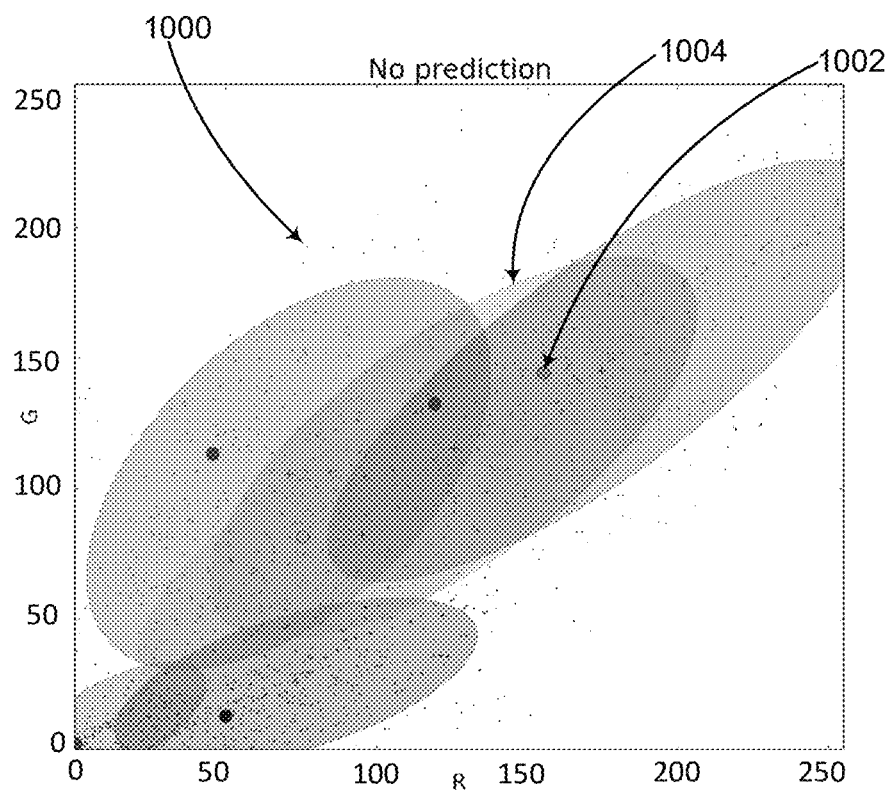
FIGS. 10A-10B illustrate exemplary zero-order probabilities and first-order probabilities, respectively, determined for an exemplary set of training images and a test image received from a user device.
Figure 10B:
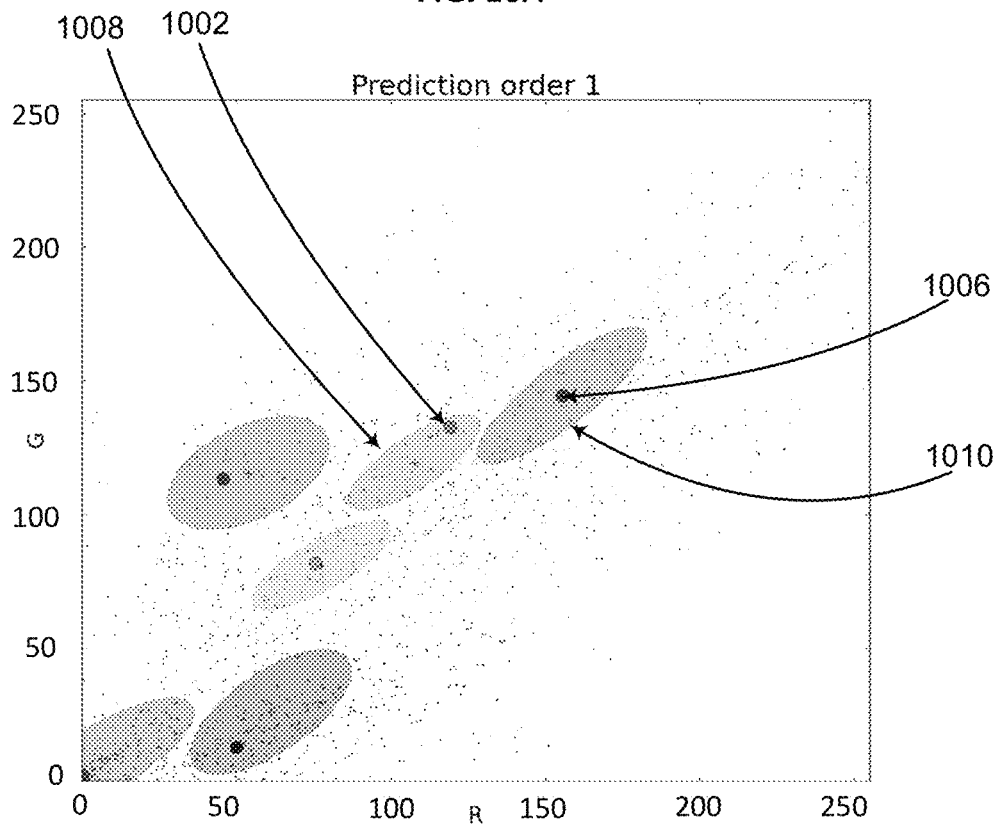

FIGS. 10A-10B illustrate zero-order probabilities and first-order probabilities, respectively, determined using exemplary set of training images for a training object 400 as shown in FIG. 4.

In FIGS. 10A and 10B, the small dots (e.g., dot 1000) are plotted coordinates corresponding to R and G values (e.g., from RGB color values) determined for sub-regions of a training object region across a set of test images. For example, small dot 1000 may be a mean color value for a training image sub-region as determined at 308. Each small dot is similar to the R-G coordinates plotted in FIG. 6B. Each circle, (e.g., circle 1002) indicates determined R and G values (e.g., from RGB color values) for a test image sub-region corresponding to a component of an object depicted in a test image received from a user device. For example, circle 1002 may be a mean color value for a test image sub-region determined as indicated at operation 808.

In FIG. 10A, the large ellipses, e.g., ellipse 1004, illustrate a zero-order probability for a particular color class. For example, ellipse 1004 may be a zero-order probability distribution determined as indicated at operation 316. Circle 1002 falls within zero-order probability ellipse 1004 more than it falls within any other zero-order probability ellipse, which provides a visual cue that the test-image sub-region associated with circle 1002 may be assigned a hypothesis color corresponding to ellipse 1004. The test image sub-region indicated by circle 1002 may be assigned a hypothesis color class based on having the highest probability of falling within the zero-order probability distribution indicated by ellipse 1004, e.g., determined as indicated at operation 818.

In FIG. 10B, first-order conditional probability distributions have been determined for test image sub-regions (e.g., sub-regions y) based on a hypothesis color class assigned to a selected test image sub-region (e.g., a sub-region x) indicated by circle 1006. The assessment of first-order conditional probability distributions for other test image sub-regions may be determined as indicated at operations 902-914.

In FIG. 10B, the first-order conditional probability distributions for the test image sub-regions are small compared to the zero-order probability distributions indicated in FIG. 10A, as is evident from the smaller size of, e.g., ellipse 1008 in comparison with ellipse 1004. This demonstrates the efficacy of using first-order conditional probability distributions for determining probably color classes for test image sub regions. For example, in comparison with the ellipse indicating zero-order probability distribution $p(x_A)$ indicated at ellipse 1004, the most probable color class for the test image sub-region color value 1002 can be more accurately determined using $p(x_A|x_B)$ as indicated at ellipse 1008, where A is the color class 1002 associated with ellipse 1008 and B is the color class 1006 associated with ellipse 1010.

Figure 11:
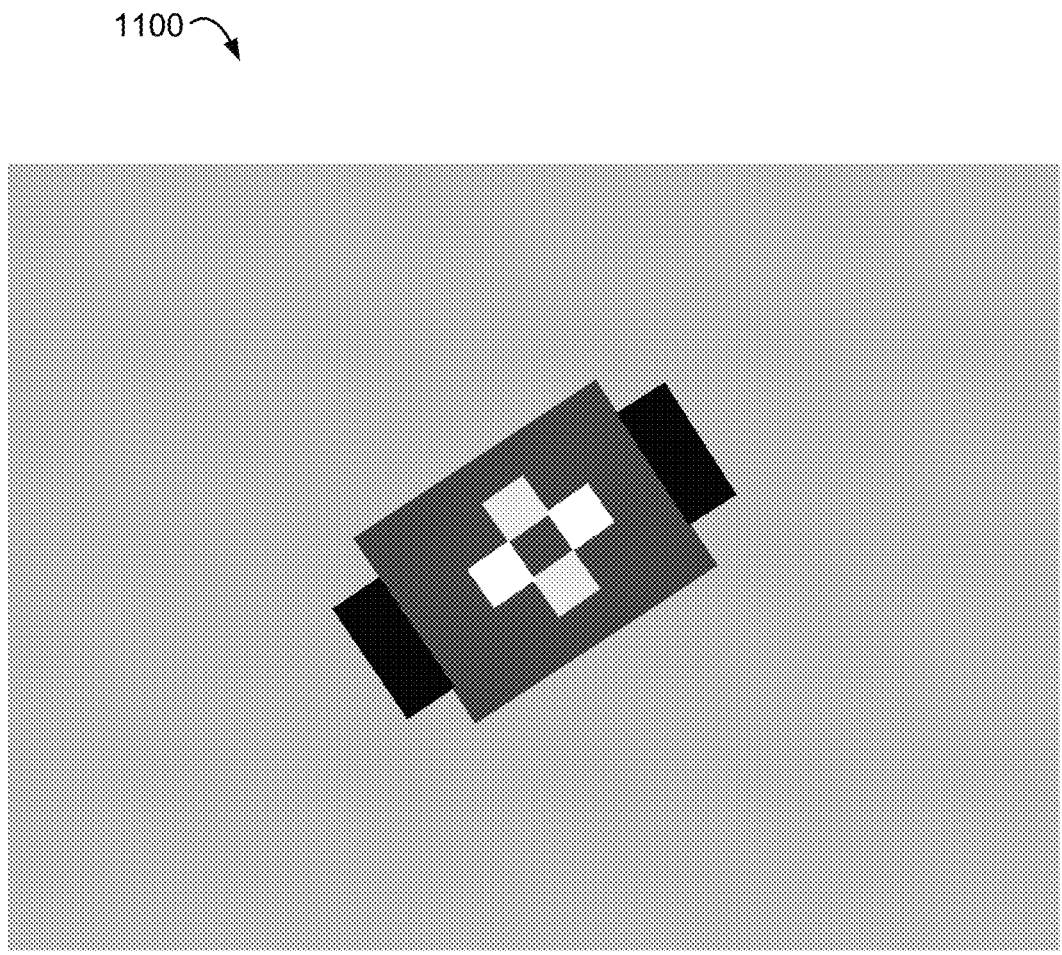
FIG. 11 illustrates an exemplary output image generated based on a test image received from a user device.

FIG. 11 illustrates an exemplary output image generated by image processing device 204 based on an image received from a user device 202, e.g., test image 100. In accordance with various embodiments, image processing device 204 may generate image 1100 using colors determined in accordance with a color classification technique as described with reference to FIGS. 8-9. Output image 1100 may be used, e.g., as an avatar or other image in a computer program such as a video game.

Figure 12:
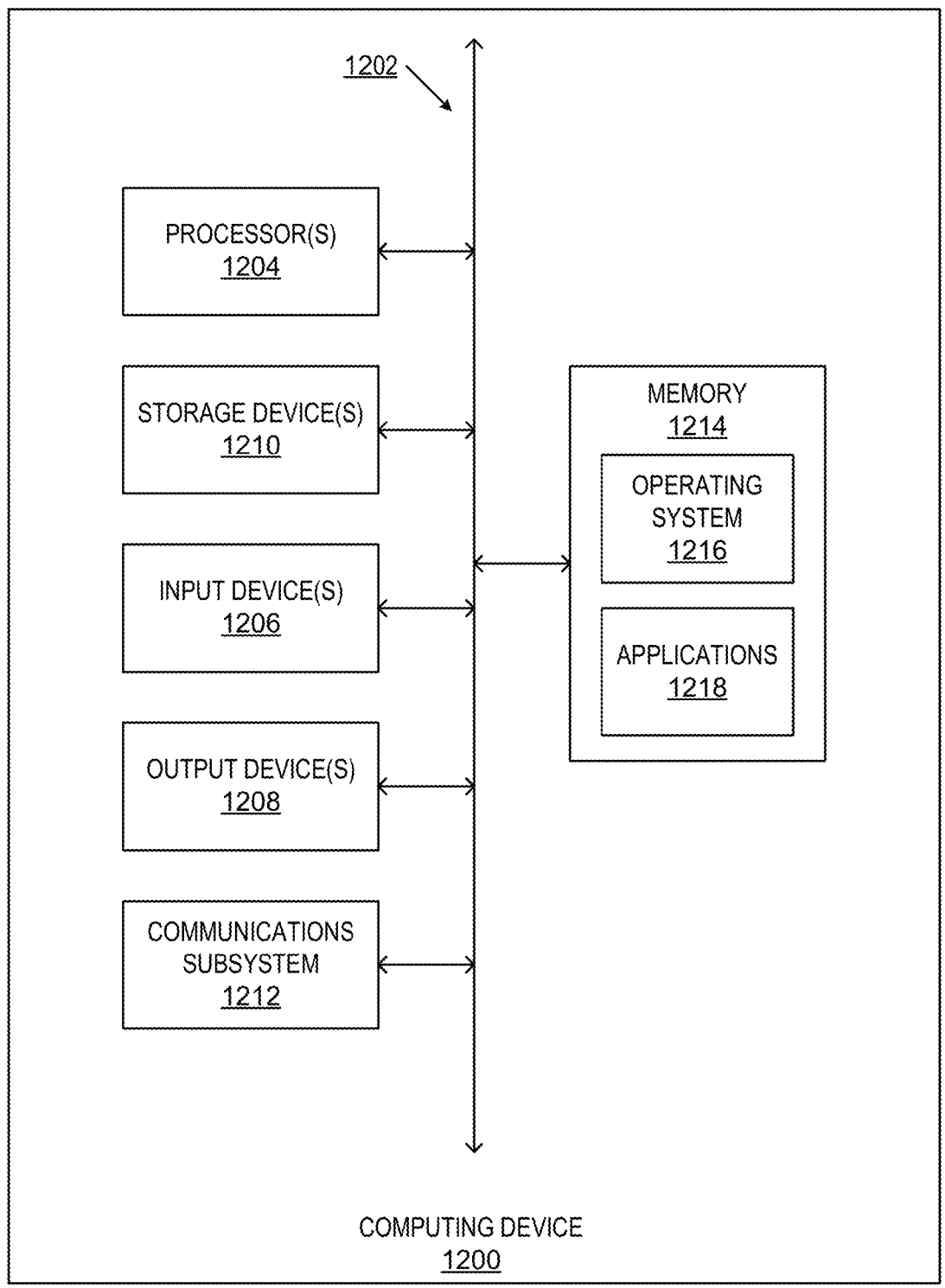
FIG. 12 illustrates an example of a computing system, according to some embodiments.

FIG. 12 provides a schematic illustration of one embodiment of a computer system 1200 that can perform the methods provided by various other embodiments, as described herein, and/or can function as a mobile device, a server, a laptop computer, a desktop computer, a game console, and/or any other computer system or device including a computer system. FIG. 1200 is meant to provide a generalized illustration of various components, any or all of which may be utilized as appropriate. FIG. 1200, therefore, broadly illustrates how individual system elements may be implemented in a relatively separated or relatively more integrated manner.

The computer system 1200 is shown comprising hardware elements that can be electrically coupled via a bus 1202 (or may otherwise be in communication, as appropriate). The hardware elements may include one or more processors 1204, including without limitation one or more general-purpose processors and/or one or more special-purpose processors (such as digital signal processing chips, graphics acceleration processors, and/or the like); one or more input devices 1206, which can include without limitation a mouse, a keyboard and/or the like; and one or more output devices 1208, which can include without limitation a display device, a printer and/or the like.

The computer system 1200 may further include (and/or be in communication with) one or more non-transitory storage devices 1210, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 1200 might also include a communications subsystem 1212, which can include without limitation a modem, a network card (wireless and/or wired), an infrared communication device, a wireless communication device and/or chipset (such as a Bluetooth™ device, an 802.11 device, a Wi-Fi device, a WiMax device, cellular communication facilities, etc.), and/or similar communication interfaces. A computing system may include one or more antennas for wireless communication as part of communications subsystems 1212 or as a separate component coupled to any portion of the system. The communications subsystem 1212 may permit data to be exchanged with a network (such as the network described below, to name one example), other computer systems, and/or any other devices described herein. In many embodiments, the computer system 1200 will further comprise a non-transitory working memory 1214, which can include a RAM and/or ROM device, as described above.

The computer system 1200 also can comprise software elements, shown as being currently located within the working memory 1214, including an operating system 1216, device drivers, executable libraries, and/or other code, such as one or more application programs 1218, which may comprise computer programs provided by various embodiments, and/or may be designed to implement methods, and/or configure systems, provided by other embodiments, as described herein. Merely by way of example, one or more procedures and/or modules described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 1210 described above. In some cases, the storage medium might be incorporated within a computer system, such as computer system 1200. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 1200 and/or might take the form of source and/or installable code, which, upon compilation and/or installation on the computer system 1200 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, an system configured to provide some or all of the features described herein can comprise hardware and/or software that is specialized (e.g., an application-specific integrated circuit (ASIC), a software method, etc.) or generic (e.g., processor(s) 1204, applications 1218, etc.) Further, connection to other computing devices such as network input/output devices may be employed.

Some embodiments may employ a computer system (such as the computer system 1200) to perform methods in accordance with the disclosure. For example, some or all of the procedures of the described methods may be performed by the computer system 1200 in response to processor 1204 executing one or more sequences of one or more instructions (which might be incorporated into the operating system 1216 and/or other code, such as an application program 1218) contained in the working memory 1214. Such instructions may be read into the working memory 1214 from another computer-readable medium, such as one or more of the storage device(s) 1210. Merely by way of example, execution of the sequences of instructions contained in the working memory 1214 might cause the processor(s) 1204 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 1200, various computer-readable media might be involved in providing instructions/code to processor(s) 1204 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 1210. Volatile media include, without limitation, dynamic memory, such as the working memory 1214. Transmission media include, without limitation, coaxial cables, copper wire and fiber optics, including the wires that comprise the bus 1202, as well as the various components of the communications subsystem 1212 (and/or the media by which the communications subsystem 1212 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, and/or any other magnetic medium, a CD-ROM, any other optical medium, punchcards, papertape, any other physical medium with patterns of holes, a RAM, a PROM, EPROM, a FLASH-EPROM, any other memory chip and/or cartridge, a carrier wave as described hereinafter, and/or any other medium from which a computer can read instructions and/or code.

Various forms of computer-readable media may be involved in carrying one or more sequences of one or more instructions to the processor(s) 1204 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1200. These signals, which might be in the form of electromagnetic signals, acoustic signals, optical signals and/or the like, are all examples of carrier waves on which instructions can be encoded, in accordance with various embodiments.

The communications subsystem 1212 (and/or components thereof) generally will receive the signals, and the bus 1202 then might carry the signals (and/or the data, instructions, etc. carried by the signals) to the working memory 1214, from which the processor(s) 1204 retrieves and executes the instructions. The instructions received by the working memory 1214 may optionally be stored on a non-transitory storage device 1210 either before or after execution by the processor(s) 1204.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-defined circuits, processes, algorithms, structures, and techniques have been shown without unnecessary detail in order to avoid obscuring the embodiments. This description provides example embodiments, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments were described as processes depicted as flow diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

What is claimed is:

1. A method for assigning a color class of a defined finite set of colors to at least one sub-region within a test image, comprising, by an image processing device:
    receiving the test image from a user device;
    identifying a plurality of sub-regions within the test image, wherein pixels within a sub-region of the test image have substantially the same color;
    selecting a first sub-region of the plurality of sub-regions, determining a first sub-region color value for the first sub-region;
    determining, using the first sub-region color value and a plurality of zero-order probability distributions, a first color class of the defined finite set of colors as a hypothesis color for the first sub-region, wherein the first color class is a highest probability color class for the first sub-region color value;
    selecting a second sub-region of the plurality of sub-regions;
    determining a second sub-region color value for the second sub-region;
    determining, using the second sub-region color value and a conditional probability distribution conditioned on the hypothesis color for the first sub-region, a second color class of the defined finite set of colors to assign to the second sub-region, wherein the second color class is a highest probability color class for the second sub-region color value; and
    assigning the second color class to the second sub-region.

2. The method of claim 1, further comprising:
    calculating a first joint probability score associated with the hypothesis color for the first sub-region, using:
        a first probability based on:
            a zero-order probability distribution associated with the hypothesis color for the first sub-region, and
            the first sub-region color value; and
        a second probability based on:
            the conditional probability distribution conditioned on the hypothesis color for the first sub-region, and
            the second sub-region color value.

3. The method of claim 2, further comprising:
    calculating a plurality of joint probability scores, wherein each joint probability score is associated with a hypothesis color determined for a different sub-region of the plurality of sub-regions; and
    assigning colors to the plurality of sub-regions based on a highest joint probability score.

4. The method of claim 1, wherein:
    the test image includes an object region corresponding to an object,
    the object region includes a plurality of sub-regions corresponding to components of the object, and
    each component of the object has a color from the defined finite set of colors.

5. The method of claim 1, wherein the plurality of zero-order probability distributions are determined using a plurality of training images, wherein a first training image of the plurality of training images is captured in a different lighting environment from a second training image of the plurality of training images.

6. The method of claim 5, wherein a training image of the plurality of training images includes a training object region corresponding to a training object, wherein a training object includes all colors of the defined finite set of colors.

7. The method of claim 5, wherein the conditional probability distribution is determined using at least a first zero-order probability distribution and a second zero-order probability distribution of the plurality of zero-order probability distributions.

8. The method of claim 1, further comprising:
    selecting a third sub-region of the plurality of sub-regions;
    determining a third sub-region color value for the third sub-region;
    determining, using the third sub-region color value and a conditional probability distribution conditioned on:
        the hypothesis color for the first sub-region, and
        the second color class assigned to the second sub-region,
    a third color class of the defined finite set of colors to assign to the third sub-region, wherein the third color class is a highest probability color class for the third sub-region color value; and assigning the third color class to the third sub-region.

9. A system for assigning a color class of a defined finite set of colors to at least one sub-region within a test image, the system comprising:
a processor; and
a memory coupled to the processor and configurable for storing instructions;
wherein the processor is configured to:
receive the test image from a user device;
identify a plurality of sub-regions within the test image, wherein pixels within a sub-region of the test image have substantially the same color;
select a first sub-region of the plurality of sub-regions,
determine a first sub-region color value for the first sub-region;
determine, using the first sub-region color value and a plurality of zero-order probability distributions, a first color class of the defined finite set of colors as a hypothesis color for the first sub-region, wherein the first color class is a highest probability color class for the first sub-region color value;
select a second sub-region of the plurality of sub-regions;
determine a second sub-region color value for the second sub-region;
determine, using the second sub-region color value and a conditional probability distribution conditioned on the hypothesis color for the first sub-region, a second color class of the defined finite set of colors to assign to the second sub-region, wherein the second color class is a highest probability color class for the second sub-region color value; and
assign the second color class to the second sub-region.

10. The system of claim 9, wherein the processor is further configured to:
calculate a first joint probability score associated with the hypothesis color for the first sub-region, using:
a first probability based on:
a zero-order probability distribution associated with the hypothesis color for the first sub-region, and
the first sub-region color value; and
a second probability based on:
the conditional probability distribution conditioned on the hypothesis color for the first sub-region, and
the second sub-region color value.

11. The system of claim 10, wherein the processor is further configured to:
calculate a plurality of joint probability scores, wherein each joint probability score is associated with a hypothesis color determined for a different sub-region of the plurality of sub-regions; and
assign colors to the plurality of sub-regions based on a highest joint probability score.

12. The system of claim 9, wherein:
the test image includes an object region corresponding to an object,
the object region includes a plurality of sub-regions corresponding to components of the object, and
each component of the object has a color from the defined finite set of colors.

13. The system of claim 9, wherein, the plurality of zero-order probability distributions are determined using a plurality of training images, wherein a first training image of the plurality of training images is captured in a different lighting environment from a second training image of the plurality of training images.

14. The system of claim 13, wherein a training image of the plurality of training images includes a training object region corresponding to a training object, wherein a training object includes all colors of the defined finite set of colors.

15. The system of claim 13, wherein the conditional probability distribution is determined using at least a first zero-order probability distribution and a second zero-order probability distribution of the plurality of zero-order probability distributions.

16. The system of claim 9, wherein the processor is further configured to:
select a third sub-region of the plurality of sub-regions;
determine a third sub-region color value for the third sub-region;
determine, using the third sub-region color value and a conditional probability distribution conditioned on:
the hypothesis color for the first sub-region, and
the second color class assigned to the second sub-region,
a third color class of the defined finite set of colors to assign to the third sub-region, wherein the third color class is a highest probability color class for the third sub-region color value; and
assign the third color class to the third sub-region.

17. A non-transitory computer-readable storage medium storing computer executable code for assigning a color class of a defined finite set of colors to at least one sub-region within a test image, comprising:
receiving the test image from a user device;
identifying a plurality of sub-regions within the test image, wherein pixels within a sub-region of the test image have substantially the same color;
selecting a first sub-region of the plurality of sub-regions,
determining a first sub-region color value for the first sub-region;
determining, using the first sub-region color value and a plurality of zero-order probability distributions, a first color class of the defined finite set of colors as a hypothesis color for the first sub-region, wherein the first color class is a highest probability color class for the first sub-region color value;
selecting a second sub-region of the plurality of sub-regions;
determining a second sub-region color value for the second sub-region;
determining, using the second sub-region color value and a conditional probability distribution conditioned on the hypothesis color for the first sub-region, a second color class of the defined finite set of colors to assign to the second sub-region, wherein the second color class is a highest probability color class for the second sub-region color value; and
assigning the second color class to the second sub-region.

18. The non-transitory computer-readable storage medium of claim 17, wherein the computer executable code further comprises code for:
calculating a first joint probability score associated with the hypothesis color for the first sub-region, using:
a first probability based on:
a zero-order probability distribution associated with the hypothesis color for the first sub-region, and
the first sub-region color value; and
a second probability based on:

the conditional probability distribution conditioned on the hypothesis color for the first sub-region, and the second sub-region color value.

19. The non-transitory computer-readable storage medium of claim 18, wherein the computer executable code further comprises code for:

calculating a plurality of joint probability scores, wherein each joint probability score is associated with a hypothesis color determined for a different sub-region of the plurality of sub-regions; and assigning colors to the plurality of sub-regions based on a highest joint probability score.

20. The non-transitory computer-readable storage medium of claim 17, wherein:

the test image includes an object region corresponding to an object, the object region includes a plurality of sub-regions corresponding to components of the object, and each component of the object has a color from the defined finite set of colors.

21. The non-transitory computer-readable storage medium of claim 17, wherein the plurality of zero-order probability distributions are determined using a plurality of training images, wherein a first training image of the plurality of training images is captured in a different lighting environment from a second training image of the plurality of training images.

22. The non-transitory computer-readable storage medium of claim 21, wherein a training image of the plurality of training images includes a training object region corresponding to a training object, wherein a training object includes all colors of the defined finite set of colors.

23. The non-transitory computer-readable storage medium of claim 21, wherein the conditional probability distribution is determined using at least a first zero-order probability distribution and a second zero-order probability distribution of the plurality of zero-order probability distributions.

24. The non-transitory computer-readable storage medium of claim 17, wherein the computer executable code further comprises code for:

selecting a third sub-region of the plurality of sub-regions;

determining a third sub-region color value for the third sub-region;

determining, using the third sub-region color value and a conditional probability distribution conditioned on:

the hypothesis color for the first sub-region, and the second color class assigned to the second sub-region, a third color class of the defined finite set of colors to assign to the third sub-region, wherein the third color class is a highest probability color class for the third sub-region color value; and assigning the third color class to the third sub-region.

25. A computing device for assigning a color class of a defined finite set of colors to at least one sub-region within a test image, comprising:

means for receiving the test image from a user device;

means for identifying a plurality of sub-regions within the test image, wherein pixels within a sub-region of the test image have substantially the same color;

means for selecting a first sub-region of the plurality of sub-regions, means for determining a first sub-region color value for the first sub-region;

means for determining, using the first sub-region color value and a plurality of zero-order probability distributions, a first color class of the defined finite set of colors as a hypothesis color for the first sub-region, wherein the first color class is a highest probability color class for the first sub-region color value;

means for selecting a second sub-region of the plurality of sub-regions;

means for determining a second sub-region color value for the second sub-region;

means for determining, using the second sub-region color value and a conditional probability distribution conditioned on the hypothesis color for the first sub-region, a second color class of the defined finite set of colors to assign to the second sub-region, wherein the second color class is a highest probability color class for the second sub-region color value; and means for assigning the second color class to the second sub-region.

* * * * *